United States Patent [19]
Orthey

[11] Patent Number: 4,739,556
[45] Date of Patent: Apr. 26, 1988

[54] HAND GRASS SHEARS

[75] Inventor: Gebhard Orthey, Nauroth, Fed. Rep. of Germany

[73] Assignee: Wolf-Gerate GmbH, Fed. Rep. of Germany

[21] Appl. No.: 904,337

[22] Filed: Sep. 5, 1986

[30] Foreign Application Priority Data

Sep. 6, 1985 [DE] Fed. Rep. of Germany ....... 3531882
Sep. 6, 1985 [DE] Fed. Rep. of Germany ....... 3531881

[51] Int. Cl.$^4$ .............................................. B26B 13/00
[52] U.S. Cl. ...................................... 30/248; 30/251; 30/DIG. 5
[58] Field of Search .................. 30/231, 235, 248, 251, 30/253, DIG. 5, 257

[56] References Cited

U.S. PATENT DOCUMENTS

| 3,325,896 | 6/1967 | D'Angelo et al. | 30/268 |
| 3,339,281 | 9/1967 | Chow | 30/262 |
| 3,907,354 | 9/1975 | Ocampo | 30/251 |

FOREIGN PATENT DOCUMENTS

| 1212342 | 3/1966 | Fed. Rep. of Germany. | |
| 8326028 | 12/1983 | Fed. Rep. of Germany. | |
| 666802 | 2/1952 | United Kingdom | 30/262 |

Primary Examiner—Douglas D. Watts
Attorney, Agent, or Firm—Ostrolenk, Faber, Gerb & Soffen

[57] ABSTRACT

The swivel joint of the shears comprises a dish-like rotary head 14 which is moulded from plastic and which is inserted with an inner bush 46 into a swivel joint bush 44 of an extension provided with the fixed upper grip 10. The axial fixing is via a detent means 54, 56.

On the rotary head 40 the lower blade 50 is fixedly disposed and the upper blade 68 is pivotal on a bearing bush 58 of the rotary head. A pull rod 78 led through the bush 46 is anchored with a bent end to the movable upper blade laterally of the pivot axis thereof. The other end is anchored in an adjustment bush 82 which is adjustably fixed in an adjustment pin 84. The locking is by a plastic slide 24 which is disposed at the front end of the upper grip and can easily be displaced with the thumb to lock or unlock the lower grip or movable blade.

12 Claims, 4 Drawing Sheets

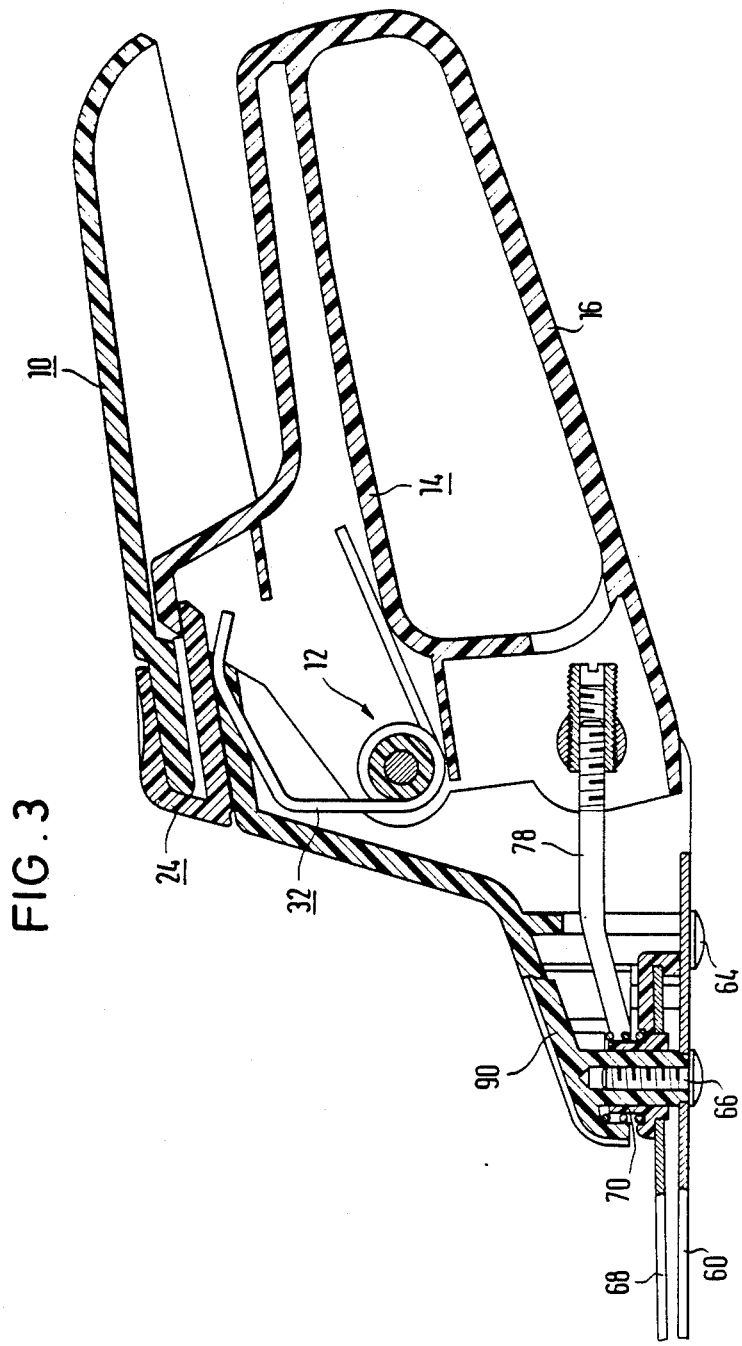

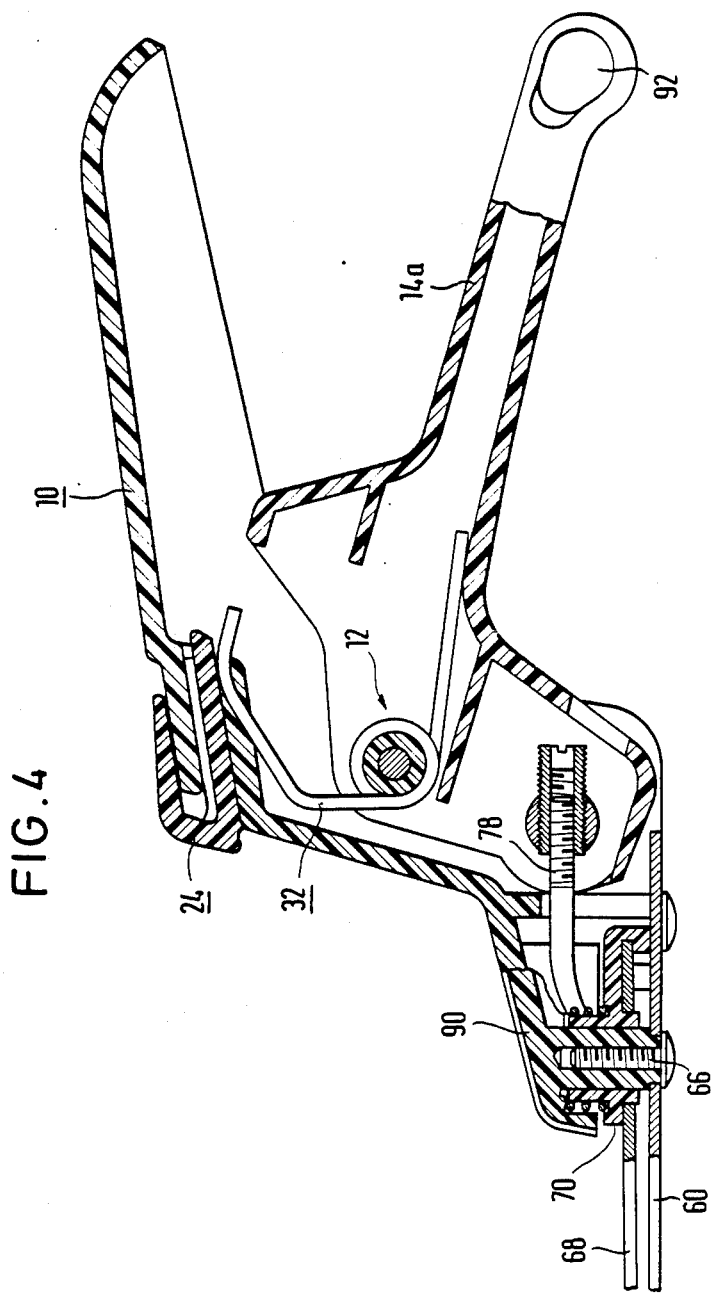

HAND GRASS SHEARS

The invention relates to hand grass shears of the type set forth in the preamble of claim 1. Such hand grass shears are known from DE-PS No. 1,212,342.

The invention is therefore based on the problem of improving hand grass shears of the type according to the preamble so that production is made more economical by simplifying the assembly, compact shears which are easy to operate being obtained which functionally fulfil all the expectations and largely eliminate any risk of injury.

This problem is solved by the features set forth in the characterizing clause of claim 1.

By the formation of the rotary head from plastic covering all the mechanism parts of the shears mechanism the danger that on operation thereof a finger can reach the transmission mechanism and be clamped therein is reduced.

In the known hand grass shears the arresting member for the hand grips is formed as spring metal plate against which the front edge of the lower grip bears in the arresting position. The free leg of the spring can be pressed inwardly by spring pressure to enable the free lower edge of the lower grip to engage and by the opening spring the lower portion is pressed against the spring. When the grip portions are pressed together the arresting spring jumps out downwardly and the shears can be freely actuated. There is a danger here that when carelessly put down or unskillfully operated the shears can unintentionally open so that the grips and shear blades spring apart under the action of the expansion spring and this can lead to injuries.

The invention is therefore also based on the problem of improving hand grass shears of the type according to claim 6 so that the arresting member, which is of simple construction and can be simply assembled, can be easily operated, its mode of operation being clearly apparent.

This sub-problem is solved by the features set forth in the characterizing clause of claim 6.

Further convenient developments of the invention are apparent from the subsidiary claims.

The plastic construction of the swivel joint and the shears joint carried thereby permits an easy-moving soft pivoting, the swivel joint being able to engage reliably in various detent positions. It is provided in particular for the shear blades to pivot from a centre position towards both sides by 90° in each case, in steps in each case of 22.5°.

The advantage of the rotary head construction lies in the integration of various functions which will be set forth below:

Easy assembly by engagement on the upper grip, utilizing the elasticity of the plastic.

Rotational arresting in the range 0°–180°, arresting every 22.5°, utilizing the elasticity of the plastic.

Stop 0° and 180° simultaneous compensation of the wing tolerances by resilient formation of the stop in the upper grip in the longitudinal direction.

Swivel joint for upper blade is a plastic-plastic combination integrated in a screw-on tube.

Accommodation of the lower blade by pivoting and simultaneous stabilizing of the rotary head by the lower blade.

Covering of the entire mechanism swivel joint, pull rod, slide bush and mounting. On the rotary head at the top a grip knurling with directionarrows for adjustment is disposed.

Below examples of embodiment of the invention will be described with the aid of the drawings, wherein:

Fig. 3 is a section through hand grass shears in which the blade cutting plane is not adjustable with respect to the grips, the shears being disposed in the closed state;

FIG. 4 is a sectional view of a further embodiment of hand grass shears comprising a cutting plane fixedly set with respect to the hand grips and an embodiment of the lower grip simplified compared with FIG. 3, the shears being illustrated in the unlocked open state.

Figure 1:
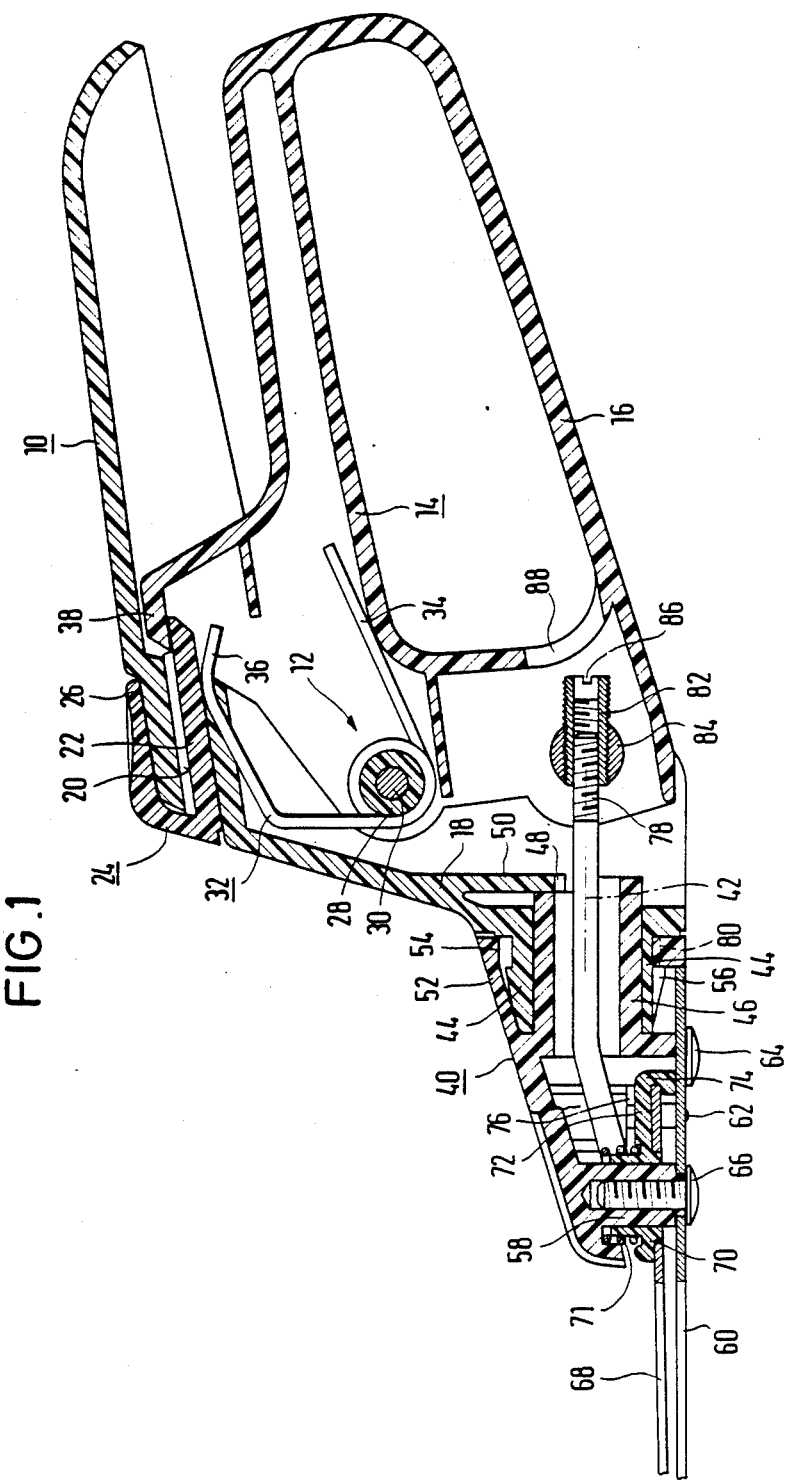
FIG. 1 is a sectional view of hand grass shears with swivel joint for changing the blade cutting angle, in the closed state.

The hand grass shears comprise an upper grip 10 moulded from plastic and a lower grip 14 which is pivotal with respect thereto via a swivel joint 12 and which is completed via an integrally formed stirrup-like lower portion 16 to give a closed ring. The lower grip also consists of plastic and is surrounded in the front region of the swivel joint 12 by the dish-shaped downwardly directed extension 18 of the upper grip 10.

The upper grip comprises at its front upper end a slot 20 through which the lower leg 22 of a U-shaped cross-sectioned slide 24 can be inserted into the interior of the dish-shaped grip. The upper leg 26 of the slide runs on the somewhat set-back front upper side of the grip 10 so that its preferably knurled upper surface can be conviently pushed forwardly and rearwardly by the thumb of the hand enclosing the grips. At the front laterally the slide 24 is dish-shaped downwardly so that it aligns laterally and at the front with surfaces of the upper grip 10.

The swivel joint 12 comprises a joint bush 28 which is inserted in aligning holes in the side walls of the lower grip dishes. Holes of the side walls of the upper grip dish aligning with the joint bush 28 are traversed by a centre-grooved dowel pin 30 which is led through the bush 28 and ensures the pivot connection of the two grips 10, 14.

Between the side walls of the lower grip 14 a leg spring 32 is provided the purpose of which is to push the lower grip and the upper grip apart. This leg pin 32 constructed as wire spring is coiled annularly in its centre portion and drawn onto the joint bush 28. Its lower leg 34 bears on the inner side of the lower grip 14 and its upper slightly angled leg 36 bears against the lower leg 22 of the slide 24 and acts via the latter on the upper grip 10. By the spring force the slide is biased in its guide and between the slide and upper grip at any desired positions detent cams or detent depressions are provided which ensure the two shift positions of the slide apparent from FIGS. 1 and 2. These two detent positions are fixed by the spring 32. In the closed position according to FIG. 1 the lower grip is held by the lower leg 22 of the locking slide 24 which engages behind an extension 38 of the lower grip and holds the latter on the upper grip 10. In the advance position according to FIG. 2 the slide releases this extension and the lower grip can move apart under the action of the spring 32 as illustrated.

Except for the leg spring 32 and the centre-grooved dowel pin 30 all the parts described above are injection moulded from plastic. The rotary head 40 also consists of plastic. This rotary head serves to make the shear blades adjustable with respect to the grips about an axis 42 which extends parallel to the cutting plane of the blades and perpendicularly intersects the joint axis of the grip swivel joint 12.

For mounting the rotary head 40 the upper grip extension 18 comprises at the front lower end side an integrally formed swivel joint bush 44 into which a bush 46 formed in the interior of the rotary head projects. At its end on the right in FIGS. 1 and 2 the bush 46 is provided with a step 48 which extends over 180° and into which a stop extension 50 of the upper grip extension 18 extends which limits the pivot movement from the position illustrated in FIGS. 1 and 2 to 90° in each of the two swivel directions.

The rotary head surrounds the swivel joint bush 44 with a dish-shaped cover 52 which is provided with a grip knurling.

In the interior of the cover 52 an inwardly projecting detent 54 engages behind a projection 56 projecting radially outwardly from the swivel joint bush, the rotary joint head thereby being secured from removal from the rotary joint bush 44. The assembly can however be effected simply in that the rotary joint head is inserted with its bush 46 into the swivel joint bush 44 and establishes the detent connection with the cover, the plastic yielding elastically and permitting the pushing on but because of the subsequently engaging detent faces preventing withdrawal.

In the front portion of the dish-shaped rotary head 40 at the inside a bearing bush 58 is formed whose axis extends perpendicularly to the cutting plane of the blades. The fixed lower blade 60 is secured by means of a grooved dowel pin 62 and by means of screws 64 and 66 to the lower side of the rotary head 40. The screw 66 is screwed into the bearing bush 58 forming the shear joint.

The movable upper blade 68 is mounted pivotally on the bearing bush 58 by means of a slide bush 70 inserted into a hole of the shear blade. This slide bush 70 of plastic is integrally connected to a bearing flange 72 which lies above the rear portion of the blade and is provided with a portion 74 engaging round the lower edge of the blade. The flange 72 runs along the lower side of the rotary head, the contact of the plastic surfaces ensuring a lower friction. The blade movement is outwardly limited by a stop 76 which projects upwardly from the flange 72 and cooperates with counterstops in the interior of the rotary head.

Onto the bearing bush 58 a helical pressure spring 71 is fitted which biases the upper blade 68 against the lower blade 60. By the detent arrangement in any rotary position of the rotary head 40 movement of the upper blade with respect to the lower blade can be effected. The rotary position of the rotary head with respect to the upper grip extension can be fixed by rotary detents 80 between the rotary head and swivel joint bush 44, said detents preferably being disposed at angular intervals of 22.5°.

The front bent end of a pull rod 78 led through the bush 46 is anchored in a hole of the upper blade laterally of the shears joint.

The rear end of the pull rod 78 is supported axially in an adjustment bush 82. Said adjustment bush 10 is screwed with an external thread into a transversely extending threaded hole of an adjustment pin 84 which is inserted into the two side walls of the lower grip running between the latter. The adjustment bush 82 comprises in the rear portion transverse slots 86 or key lugs with which it can be turned using a tool to enable the closure position of the blades to be fixed. The tool can be introduced through a hole 88 of the lower grip.

To ensure that with an only relatively small angular rotation of the adjustment bush 82 even relatively large tolerances can be bridged, apart from the threaded connection between the adjustment bush and adjustment pin a further threaded connection is provided between the adjustment bush (internal thread) and pull rod 78 (external thread). These threads are formed as differential threads, the adjustment bush having at the inside for example a right-hand thread M5(p=0.8 mm) and at the outside a left-hand thread M8×1(p=1 mm).

The shears function as follows: by pushing the slide 24 forwardly the shears are unlocked and under the action of the spring 32 move into the position shown in FIG. 2. By actuating the lower grip 14 via the pull rod 78 the upper blade 68 is moved with respect to the lower blade 60 and a cutting motion thus results.

Figure 2:
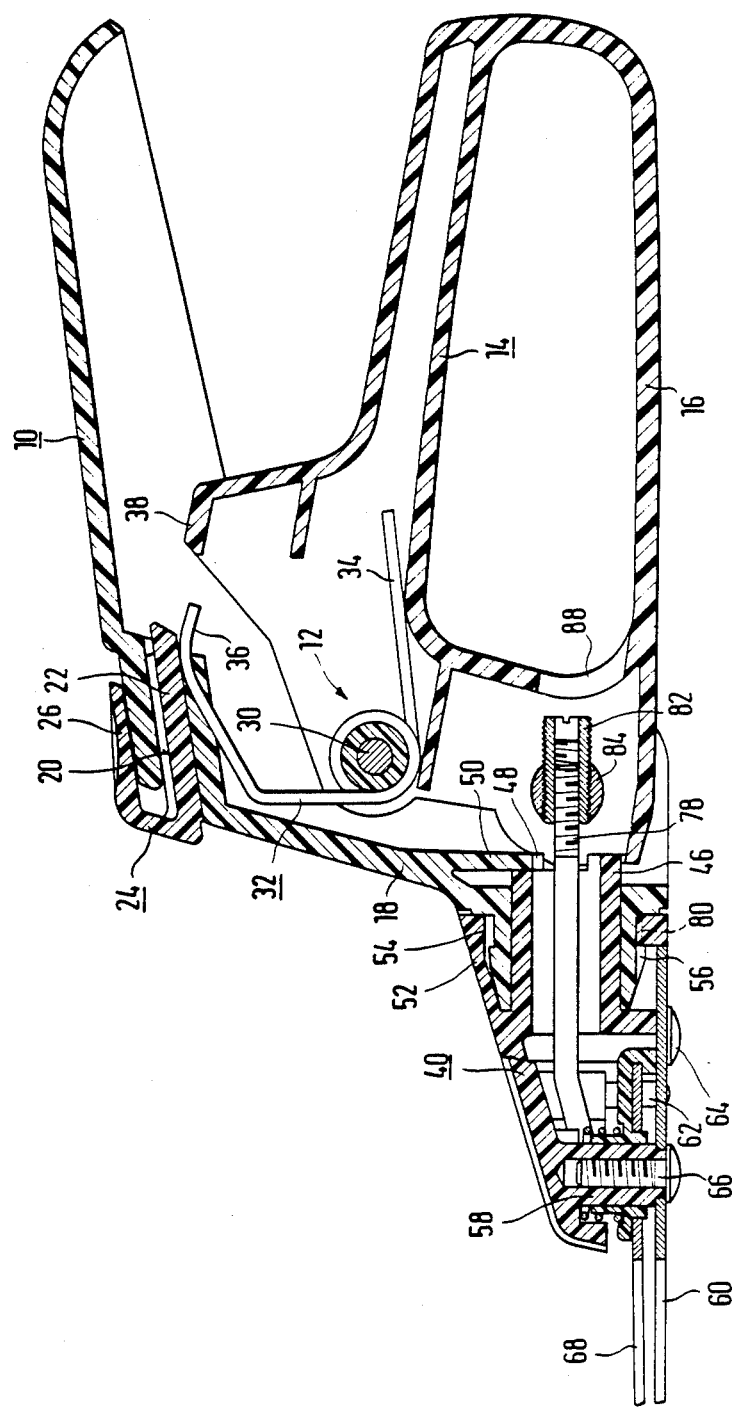
Fig. 2 shows the hand grass shears illustrated in FIG. 1 in the unlocked opened state.

Both in the closed and locked position according to FIG. 1 and in the open position according to FIG. 2 the rotary head 40 can be turned with respect to the grips so that the ergonometrically most favourable handling of the shears can be obtained for any use.

The shears according to FIGS. 3 and 4 are fundamentally made like the shears according to FIGS. 1 and 2 and differ from the latter substantially only in a simplification obtained by omitting the swivel joint. This means that the rotary head designated in FIG. 1 and 2 by reference numeral 40 is missing or integrally formed with the extension 18 of the upper grip. The rotary head 40 according to FIGS. 1 and 2 is thus replaced by a fixed bearing head 90 which is formed forwardly projecting on the lower portion of the extension 18 of the upper grip 10. This bearing head in turn comprises the downwardly extending bearing bush 58 for the upper blade which is actuated via the pull rod 78. The function is the same as in the shears according to FIGS. 1 and 2.

FIG. 4 illustrates a simplified embodiment of the shears of FIG. 3 with a fixed cutting plane in which the lower grip 14a is formed without bottom portion as a hand lever having a hole 92 for suspension.

I claim:

1. A portable lawn trimmer comprising:
a stationary upper handle, a lower handle below the upper handle, a pivot joint between the upper and the lower handles for enabling the lower handle to pivot toward and away from the upper handle; a forward extension from the upper handle, forward of the pivot joint, and the lower handle being disposed to pivot toward and away from the upper handle on the side of the pivot joint rearward from the forward extension of the upper handle; a spring for normally urging the lower handle to pivot away from the upper handle;
a stationary lower blade secured to the extension of the upper handle and extending forwardly therefrom; a movable upper blade also attached to the extension of the upper handle, generally overlying and movable with respect to the lower blade, and a pivot on the forward extension for supporting the upper blade to pivot laterally with respect to the lower blade for accomplishing the trimming, and means connected between the lower handle and the movable upper blade for pivoting the upper blade with respect to the lower blade as the lower handle is pivoted with respect to the upper handle;

locking means for locking the lower handle locked up toward the upper handle for preventing the pivoting of the lower handle with respect to the upper handle; the locking means comprising a slide mounted on the upper handle toward the front thereof toward the extension from the upper handle, the slide having a generally U-shaped cross-section, with an upper leg of the U shape being supported to the upper handle and a lower leg of the U shape extending into the upper handle; the lower handle having a mount thereof that moves with the lower handle and when the lower handle is pivoted toward the upper handle, the slide being movable with respect to the upper handle so that the lower leg of the slide engages the mount of the lower handle and prevents the lower handle from being pivoted apart from the upper handle under the influence of the spring.

2. The lawn trimmer of claim 1, wherein the upper handle has a front side toward the extension and the slide is disposed at the front side of the upper handle, and the legs of the U-shaped slide extend rearwardly with respect to the upper handle; the mount of the lower handle is disposed beneath the upper handle and extends forwardly toward the front of the upper handle for being in position to be engaged and supported by the lower leg of the slide when the slide is moved rearwardly in the upper handle.

3. The lawn trimmer of claim 2, wherein the spring is in the form of an elongate wire disposed at the pivot between the upper and lower handles and projects into engagement with the upper handle at the slide and with the lower handle; and means in the upper handle for supporting the slide to the upper handle.

4. A portable lawn trimmer comprising a stationary upper handle, a lower handle below the upper handle, and a pivot joint between the upper and the lower handles, and the lower handle being pivotable around the pivot joint toward and away from the upper handle; the upper handle having a forward side and having an extension extending forwardly from the forward side thereof, and the extension being forward of the pivot joint; an axis extending forward through the extension and generally transverse to the pivot axis between the upper and lower handles;

a bearing bushing supported on the extension from the upper handle, and the extension supporting the bearing bushing to pivot around the extension axis;

a stationary lower blade secured to the bearing bushing for pivoting therewith around the extension axis with respect to the upper handle;

a sliding bushing supported in the bearing bushing, a movable upper blade supported for pivoting on the sliding bushing and the movable blade being pivotable on the sliding bushing with respect to the stationary bushing, and the sliding bushing being oriented for enabling movement of the movable blade with respect to the stationary blade; and the sliding bushing, stationary blade and movable blade being pivotable together with the bearing bushing with respect to the extension to a selected pivot orientation around the extension axis;

means on the bearing bushing for detent engagement with the extension for supporting the bearing bushing on the extension to enable pivoting of the bearing bushing with respect to the extension while preventing removal of the bearing bushing off the extension; and means connected between the movable upper blade and the lower handle for being moved to move the movable blade with respect to the stationary blade as the other handle is pivoted around the pivot joint with respect to the upper handle.

5. The lawn trimmer of claim 4, wherein the extension includes a pivot bushing extending forwardly generally along the extension axis, the means on the extension for supporting the bearing bushing to the extension comprises an elevated annular projection on the pivot bushing and the bearing bushing having an annular catch that projects radially inwardly for snapping behind the elevated annular projection on the pivot bushing for preventing the bearing bushing from being withdrawn axially from the pivot bushing and from the extension.

6. The lawn trimmer of claim 4, further comprising a screw for securing the stationary blade to the sliding bushing for the movable blade, so that the movable blade and stationary blade share a common pivot axis around the screw in the sliding bushing.

7. The lawn trimmer of claim 5, wherein the catches are rotating catches and are distributed at various angles between the bearing bushing and the pivot bushing of the extension.

8. The lawn trimmer of claim 5, further comprising a limiting extension supported on the extension of the upper handle and a shoulder on the bearing bushing for the pivoting head, the shoulder being engageable with the limiting extension on the upper handle, and such engagement limiting the rotation of the pivoting head with respect to the extension over a preselected angular range.

9. The lawn trimmer of claim 8, wherein the shoulder on the bearing bushing extends 180° along the bearing bushing and the limiting extension engages that shoulder following a maximum of 180° rotation of the pivoting head.

10. The lawn trimmer of claim 4, wherein the connecting means between the movable blade and the lower handle comprises a rigid connecting rod connected to the movable blade at a location offset from the pivot mounting of the movable blade to the upper handle, whereby movement of the connecting rod generally along the direction of the extension axis moves the movable blade to pivot around the pivot therefor;

an adjustment bushing supporting the connecting rod and an adjustment pin in lower handle, with the adjustment bushing being received in the adjustment pin in the lower handle, the adjustment pin being freely pivotable in the lower handle, such that movement of the lower handle toward and away from the upper handle, through the adjustment pin, respectively pulls and pushes the connecting rod to move the connecting rod along the extension axis, thereby to pivot the movable blade.

11. The lawn trimmer of claim 10, wherein the adjustment bushing for the connecting rod has an external thread and the adjustment pin on the lower handle has an internal thread and the adjustment bushing is threaded into the adjustment pin and both threads are differential threads for appropriate rotation adjustment.

12. The lawn trimmer of claim 10, wherein initial positioning of the connecting rod with respect to the adjustment pin is obtainable by moving the connecting rod with respect to the adjustment pin and movement of the connecting rod adjusts the initial position of the movable blade with respect to the stationary blade; means in the lower handle for permitting access into the lower handle and to the connecting rod for effecting such adjustment to the connecting rod.

* * * * *